US000001144H

United States Statutory Invention Registration [19]

[11] Reg. Number: H1144

Cherry et al.

[43] Published: Mar. 2, 1993

[54] SOLID PROPELLANT ROCKET MOTOR WITH FUSIBLE END CLOSURE HOLDER

[75] Inventors: Charles C. Cherry, McGregor; Raymond E. Wiechering, Waco, both of Tex.

[73] Assignee: Hercules Incorporated, Wilmington, Del.

[21] Appl. No.: 593,725

[22] Filed: Oct. 4, 1990

[51] Int. Cl.[5] ..... F02K 1/00

[52] U.S. Cl. ..... 60/39.1; 102/481; 220/89.4

[58] Field of Search ..... 60/39.1, 253; 239/265.15; 220/201, 89.4; 102/481

[56] References Cited

U.S. PATENT DOCUMENTS

| | | | |
|---|---|---|---|
| H795 | 7/1990 | Maykut et al. | 239/265.15 |
| 3,229,635 | 1/1966 | Oss | 239/265.15 |
| 3,563,466 | 2/1971 | Clark et al. | 239/265.15 |
| 3,665,857 | 5/1972 | Radnich et al. | 102/481 |
| 3,887,991 | 6/1975 | Panella | 220/89.4 |
| 3,927,791 | 12/1975 | Hershberger | 220/89.4 |
| 4,146,180 | 3/1979 | Dettling | 239/265.15 |
| 4,458,482 | 7/1984 | Vetter et al. | 60/253 |
| 4,478,151 | 10/1984 | Vetter et al. | 102/481 |
| 4,784,061 | 11/1988 | Christopher | 102/481 |
| 4,838,166 | 6/1989 | Spies et al. | 102/481 |
| 5,036,658 | 8/1991 | Tate | 60/39.1 |

*Primary Examiner*—Michael J. Carone
*Attorney, Agent, or Firm*—Mark D. Kuller

[57] ABSTRACT

A solid propellant rocket motor comprising a motor case, solid propellant and at least one end closure, wherein at least one end closure is connected to the casing by at least one fusible connector which melts at temperatures below those that will cause autoignition of the motor but does not melt during normal propulsion, so that the end closure releases before the antoignition and is retained in place during normal propulsion.

25 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SOLID PROPELLANT ROCKET MOTOR WITH FUSIBLE END CLOSURE HOLDER

The invention is a solid propellant rocket motor capable of withstanding the insensitive munitions cook-off test.

BACKGROUND OF THE INVENTION

Heat can cause solid propellant to autoignite, causing the motor to explode, burst or move. In order to improve safety of solid propellant motors a relatively new requirement, referred to as "insensitive munitions cook-off test" (hereinafter "I.M. testing"), will soon be standard for all rocket motors. The test consists of heating the motor until autoignition occurs. To pass the test the ignited motor must remain passive while the propellant burns off, with no explosion, shrapnel or propulsion. This test ensures the safety of motors in case of fire or heat.

Current solid propellant rocket motors are not designed to withstand I.M. testing. Consequently, if a motor is subjected to cook-off temperatures, autoignition occurs, and the motor either explodes, bursts or becomes propulsive. This results because the motor is unable to relieve pressure build-up from the ignited propellant.

SUMMARY OF THE INVENTION

The invention is a solid propellant rocket motor comprising a motor case, solid propellant and at least one end closure, wherein at least one end closure is connected to the casing by at least one fusible connector which melts at temperatures below those that will cause autoignition of the motor but does not melt during normal propulsion of the motor, so that the end closure releases before the autoignition and is retained in place during normal propulsion.

DETAILED DESCRIPTION OF THE INVENTION

Figure 1:
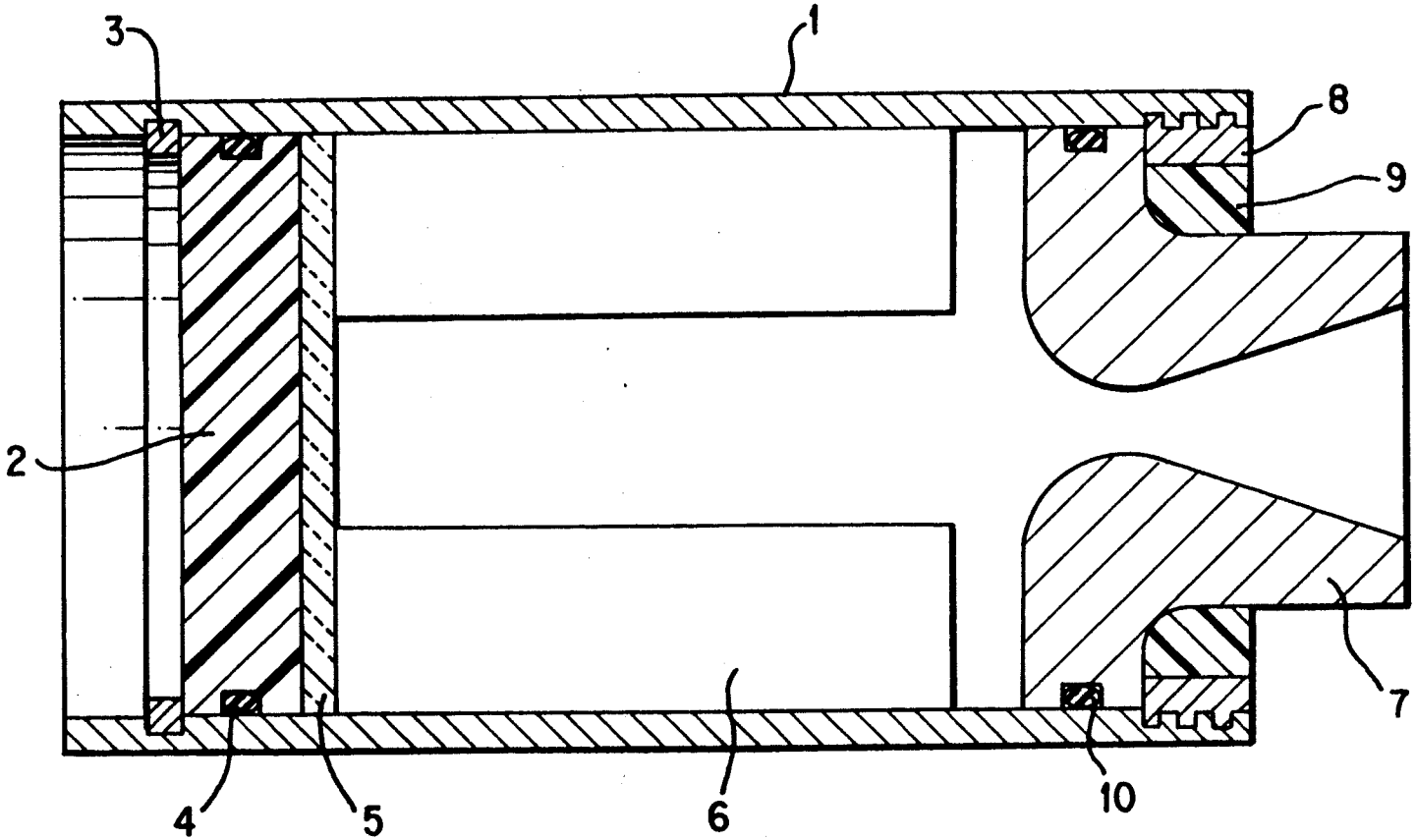
FIG. 1 shows a motor having two end closures, one retained by a threaded fusible ring and the second retained by an unthreaded fusible ring.

The term "end closure" refers to devices used to close the opening or openings of a rocket motor case. A nozzle assembly, typically comprising a nozzle, blast tube and exit cone, is used on the aft end. The nozzle assembly may be sealed, for instance, by a metal plate or foam igniter, or may be open. If the case has an opening at the forward end, a plate-like fixture is usually used to close it.

By "fusible" it is meant that the material is capable of being melted by heat. Any fusible material capable of meeting the structural and melting requirements for the connector may be used. Preferred are fusible metals alloys.

By "connector", reference is made to rings forming one or more interface of the case and end closure (which may be threaded (e.g., buttressed or so as to screw in) or unthreaded); receptacles with recesses provided for such retaining rings; pins or screws for securing the case to the end closure; and the like. The connector may be in contact with both the case and end closure, but does not have to be. For instance, it may be connected to a support member. The key is that fusible connector(s) be in position and of a material such that during normal operation the end closure is retained on the rocket motor and when the fusible material melts before autoignition, pressure is released due to release of the end closure. Release of the end closure results in the end closure falling off or being pushed off the motor during autoignition.

The specific melting temperature(s) suitable for materials useful in this invention depends on the autoignition temperature of the motor and the temperatures which the fusible connector will experience during propulsion and storage. The motor configuration, insulation, propellant, load(s) and other well known design features will dictate the preferred melting temperature and material.

Generally, the autoignition temperature of the motor will be the autoignition temperature of the solid propellant. That is, if (a) the motor is stored without an igniter, (b) the igniter does not contain pyrotechnic material or (c) the igniter contains a pyrotechnic material having a higher autoignition temperature than the propellant, the fusible connector material may be selected based on the propellant autoignition temperature. However, if the igniter has a lower autoignition temperature than the propellant and either (a) the motor is stored with the igniter in place or (b) the motor may experience high temperatures after installation of the motor, the fusible connector material should be selected so that it has a lower melting temperature than the autoignition temperature of the igniter.

Suitable fusible materials will have a melting temperature of from 200° F. to 1000° F. For most applications, the melting temperature of the fusible material will be in the range of 250° F. to 550° F. Most conventional tactical motors will require fusible materials which melt at a temperature in the range of 270° F. to 320° F.

The motors of this invention are made with conventional rocket motor materials. The case may be made of composites, metals or both, and may be insulated using conventional materials. The nozzle and forward end closures are also made with conventional materials, such as composites and metals. The propellant can be any conventional propellant, such as composite propellants. Autoignition temperature is specific to the propellant used and may be in the range of 375° F. to 575° F. Generally, solid propellant autoignition occurs at temperatures of 450° F. to 500° F.

FIG. 1 is an illustration of a motor having two end closures, one retained by a threaded fusible ring and the second retained by an unthreaded fusible ring. The motor is similar to that used by tactical applications, but has a reduced configuration for testing.

Case (1) is a metal case 15 inches long and 5 inches in diameter. The walls of the case are insulated with approximately 90 mil thick paper phenolic. (The insulation is now shown).

The forward end-closure (2) is plastic and is retained by unthreaded, fusible metal alloy retaining ring (3) (split ring). The retaining ring is made of a eutectic metal alloy of bismuth and tin with a melting point of 281° F. Rubber O-ring (4) is a pressure seal. Thermoplastic insulation (5) protects the forward end closure from heat of propulsion. The insulation will be pushed from the case upon autoignition of the motor if the forward end-closure is released by melting of the retaining ring. The propellant (6) is composite having an autoignition of 450° F.+.

The aft-end closure is nozzle assembly (7). It has a foam weatherseal and burst disc (this may be part of an assembly, including an igniter), which is not shown.

The nozzle assembly is composite and is retained by threaded, fusible metal alloy retaining ring (8). The retaining ring is made of a eutectic metal alloy of bismuth and tin with a melting point of 281° F. Nozzle support member (9) is made of plastic which is retained by the nozzle and fusible retaining ring. Rubber O-ring (10) is a pressure seal.

An igniter is not shown, but normally would be located in the forward or aft end of the motor.

While the invention has been described with respect to specific embodiments, it should be understood that they are not intended to be limiting and that many variations and modifications are possible without departing from the scope and spirit of this invention.

We claim:

1. A solid propellant rocket motor comprising a motor case, a propellant and at least one end closure, wherein at least one end closure is connected to the casing by at least one fusible connector which melts at temperatures below those that will cause autoignition of the motor but does not melt during normal propulsion of the motor, so that the end closure releases before the autoignition and is retained in place during the normal propulsion, wherein the fusible connector melts at a temperature in the range of 270° F. to 320° F.

2. A solid propellant rocket motor as claimed in claim 1 wherein the end-closure connected to the casing by a fusible connector is a nozzle assembly.

3. A solid propellant rocket motor as claimed in claim 1 wherein the end-closure connected to the casing by a fusible connector is a plate-like fixture in the forward end of the motor.

4. A solid propellant rocket motor as claimed in claim 1 wherein the fusible connector is selected from the group consisting of rings, recesses for retaining rings, pins and screws.

5. A solid propellant rocket motor as claimed in claim 4 wherein the fusible connector is made of a fusible metal alloy.

6. A solid propellant rocket motor as claimed in claim 1 wherein the fusible connector is selected from the group consisting of threaded or unthreaded rings.

7. A solid propellant rocket motor as claimed in claim 1 wherein the fusible connector is selected from the group consisting of pins and screws.

8. A solid propellant rocket motor as claimed in claim 1 wherein the fusible connector is a pin.

9. A solid propellant rocket motor as claimed in claim 1 wherein the fusible connector is made of a fusible metal alloy.

10. A solid propellant rocket motor as claimed in claim 9 wherein the metals alloy is a eutectic mixture of bismuth and tin.

11. A solid propellant rocket motor as claimed in claim 1 wherein the fusible metal melts at a temperature lower than the autoignition temperature of the solid propellant.

12. A solid propellant rocket motor as claimed in claim 1 wherein the motor contains an igniter comprising a pyrotechnic material that has an autoignition temperature lower than that of the propellant and the fusible connector melts at a temperature lower than the autoignition temperature of the pyrotechnic material.

13. A solid propellant rocket motor as claimed in claim 1 wherein the fusible connector is selected from the group consisting of recesses for retaining rings.

14. A solid propellant rocket motor as claimed in claim 1 wherein the fusible connector is selected from the group consisting of screws.

15. A solid propellant rocket motor comprising a motor case, a propellant and at least one end closure, wherein at least one end closure is connected to the casing by at least one fusible connector which melts at temperatures below those that will cause autoignition of the motor but does not melt during normal propulsion of the motor selected from the group consisting of threaded or unthreaded rings, so that the end closure releases before the autoignition and is retained in place during the normal propulsion.

16. A solid propellant rocket motor as claimed in claim 15 wherein the end-closure connected to the casing by a fusible connector is a nozzle assembly.

17. A solid propellant rocket motor as claimed in claim 15 wherein the end-closure connected to the casing by a fusible connector is as plate-like fixture in the forward end of the motor.

18. A solid propellant rocket motor as claimed in claim 15 wherein the fusible connector is made of a fusible metal alloy.

19. A solid propellant rocket motor as claimed in claim 18 wherein the metals alloy is a eutectic mixture of bismuth and tin.

20. A solid propellant rocket motor as claimed in claim 18 wherein the metal alloy melts at a temperature in the range of 250° F. to 550° F.

21. A solid propellant rocket motor as claimed in claim 15 wherein the fusible connector melts at a temperature in the range of 200° F. to 1000° F.

22. A solid propellant rocket motor as claimed in claim 15 wherein the fusible connector melts at a temperature in the range of 250° F. to 550° F.

23. A solid propellant rocket motor as claimed in claim 18 wherein the metal alloy melts at a temperature in the range of 200° F. to 1000° F.

24. A solid propellant rocket motor as claimed in claim 15 wherein the fusible metal melts at a temperature lower than the autoignition temperature of the solid propellant.

25. A solid propellant rocket motor as claimed in claim 15 wherein the motor contains an igniter comprising a pyrotechnic material that has an autoignition temperature lower than that of the propellant and the fusible connector melts at a temperature lower than the autoignition temperature of the pyrotechnic material.

* * * * *